Figure 1:
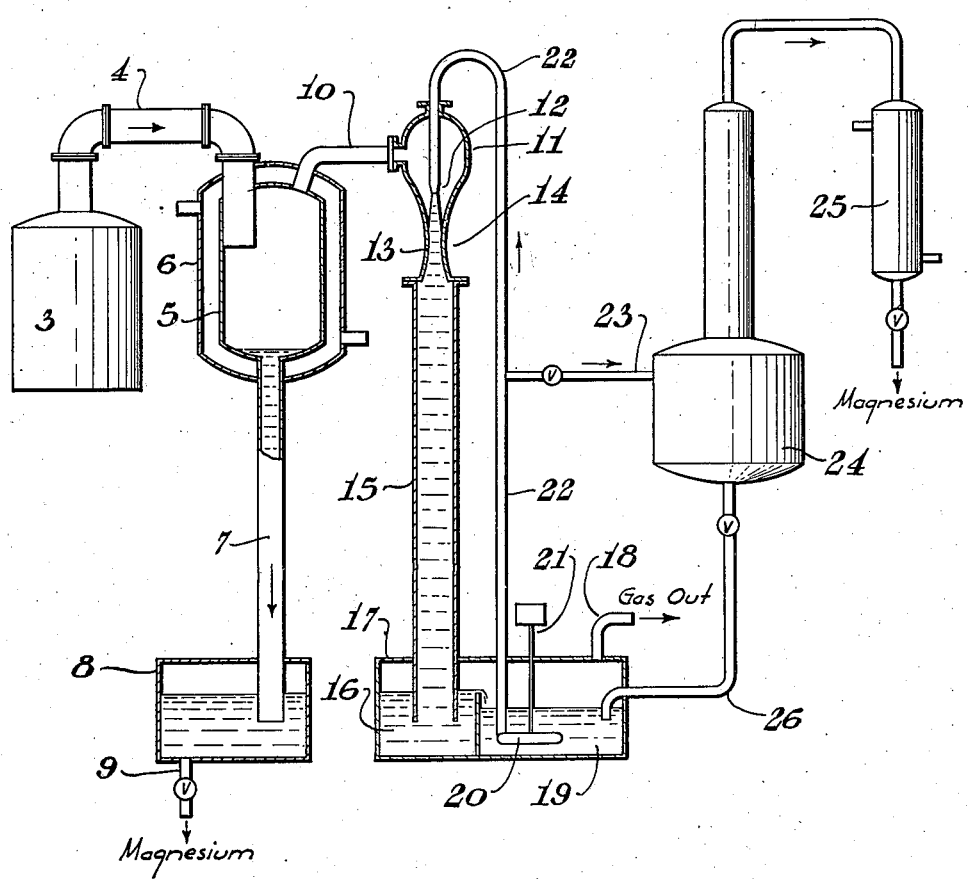

Aug. 7, 1945.   T. GRISWOLD, JR   2,381,405
RECOVERY OF MAGNESIUM
Filed Jan. 28, 1942   2 Sheets-Sheet 1

INVENTOR.
Thomas Griswold Jr.
BY
Griswold & Burdick
ATTORNEYS

Patented Aug. 7, 1945

2,381,405

UNITED STATES PATENT OFFICE 2,381,405

RECOVERY OF MAGNESIUM

Thomas Griswold, Jr., Midland, Mich., assignor to The Dow Chemical Company, Midland, Mich., a corporation of Michigan Application January 28, 1942, Serial No. 428,456

10 Claims. (Cl. 75—67)

This invention relates to the recovery of metallic magnesium from vapor mixtures thereof with non-condensable gases.

The recovery of metallic magnesium from vapor admixture with a non-condensable gas is an essential step in a number of metallurgical processes, both in the production of the metal by heating magnesium-containing ores with reducing agents and in the purification of crude magnesium by distillation. The magnesium is ordinarily recovered by cooling the vapor mixture to a temperature at which the magnesium condenses, either as a liquid or as a solid, and then collecting the condensate. However, when condensation is carried out under conditions such that the vapor pressure of the condensed magnesium is an appreciable fraction of the condenser pressure, as is the case when the concentration of magnesium in the vapor mixture is low or when the condensation is effected at elevated temperatures and at drastically reduced pressure, a significant part of the magnesium escapes uncondensed, and losses of valuable metal are unduly high. In particular, in thermal reduction processes in which the magnesium condensing apparatus is run at temperatures of 300° to 900° C. and is exhausted to an extremely low pressure, losses through the vacuum pump may, under adverse conditions, amount to several per cent of the metal condensed.

An object of the present invention is to provide a method of recovering magnesium from vapor mixtures with non-condensable gases which effectively recovers virtually all of the metal, even under conditions of high temperature and low pressure. Another object is to provide a method of evacuating residual vapor mixtures of magnesium with non-condensable gases from apparatus for condensing magnesium which simultaneously effects recovery of magnesium in the condenser exhaust. A further object is to provide apparatus for carrying out the recovery of magnesium as aforesaid.

According to the invention, magnesium is recovered from vapor admixture with a non-condensable gas by admitting the mixture into a confined zone, and directing through the zone in contact with the vapor a rapidly moving continuous stream of a liquid medium chemically inert to magnesium and accompanying gas and supplied at a condensing temperature for magnesium vapor. the velocity of the stream being sufficiently high that the vapor mixture becomes entrapped therein and is exhausted from the zone together with the moving medium. Because of the entrapping action of the fast-moving stream and the turbulent flow of the liquid therein, the vapor mixture is brought rapidly into very intimate contact with the exhausting medium and is quickly distributed throughout the latter; condensation or absorption of the magnesium is effected with great rapidity and completeness. Following the rapid recovery of magnesium from the vapor-gas mixture in this manner, the flowing exhausting medium and the remaining included non-condensable gas are transferred to a second zone where the gas is separated from the liquid medium in any desired manner, suitably by running the stream into a large reservoir to still the liquid and thus to allow the gas to bubble out of the medium. The magnesium may then be recovered from the gas-free exhausting liquid by any convenient known method, after which the liquid medium may be returned to the iintial step of the process.

In a preferred form of the process, the magnesium vapor-non-condensable gas mixture is admitted to a closely confined zone having an outlet of restricted cross-sectional area, and the stream of liquid medium is projected through the zone in the form of one or more jets which are directed into the restricted outlet, the diameter of the jet or jets and especially the rate of flow of medium therein being maintained sufficiently high that substantially all the cross-sectional area of the outlet is filled by the exiting medium and entrained non-condensed gas. In this way, the entrapping action of the moving condensing medium is utilized most effectively, the vapor mixture being exhausted from the zone and the magnesium absorbed in or condensed by the exhausting medium with great rapidity. This evacuating action of a moving jet of condensing medium may advantageously be used to maintain a predetermined sub-atmospheric pressure in the closely confined contact zone and other closed apparatus in open communication therewith merely by insuring that the velocity of the condensing medium in the jet is sufficient to exhaust the zone at a rate sufficient to maintain the desired pressure according to the general principles of a siphon jet ejector. The precise jet diameter, number of jets, and jet velocity necessary may readily be calculated for any desired capacity condenser according to known methods.

It will be appreciated that while the major part of the magnesium in the vapor mixture may be condensed instantly on contact with the jet or stream of exhausting medium or absorbed by it and hence be converted to the liquid or solid state before the medium leaves the contact zone, a small proportion of the magnesium vapor may persist in the bubbles of non-condensable gas entrapped in the moving medium after the latter leaves the contact zone. In the invention, however, even this minute quantity of magnesium may be readily condensed or absorbed by rapidly increasing the static pressure on the exhausting medium after it leaves the contact zone, whereby residual magnesium vapor is condensed, as a result both of the pressure increase itself and also of the diminution in volume of the bubbles of entrapped gas. Such static pressure increase may conveniently be brought about by sharply decreasing the velocity of the jet of exhausting medium immediately after it leaves the contact zone, as by introducing the rapidly flowing medium into a conduit of increased cross-sectional area, in accordance with Bernoulli's principle. The pressure may also be increased, when the jet of exhausting medium is at subatmospheric pressure, by leading the jet into a barometric leg through which the medium is passed to a zone of atmospheric pressure, as will be further illustrated. By utilizing this effect of pressure increase, the process of the invention permits extremely rapid and complete recovery of magnesium.

The medium employed as the condensing agent in the process may be any substance which is liquid under operating conditions and is substantially inert chemically to magnesium. In general, molten metals which absorb magesium vapor, i. e. alloy with magnesium, are preferred, especially those metals having an inappreciable vapor pressure at the operating temperature; lead and alloys of lead with magnesium are most suitable. However, other liquid condensing agents, such as liquid hydrocarbons and molten metal halide fluxes for magesium, e. g. molten carnallite, may at times be used. The temperature of the condensing medium may be maintained at any value at which the magnesium vapor is condensed or absorbed in the medium on contact therewith; in general, the temperature should not be so high as to necessitate pumping large volumes of medium and yet should be high enough that the medium has a viscosity sufficiently low to permit obtaining the requisite jet velocities without undue pumping costs. With lead and lead-magnesium alloys, temperatures of 300° C. up to about 650° C. are operable, with 450° C. to 550° C. being preferred, the precise value depending upon the operating pressure employed.

The new process may be applied to recovering magnesium from various vapor mixtures with non-condensable gases, regardless of the relative proportion of magnesium and gas in the mixture. In general, however, when the concentration of magnesium in the mixture is high, a large portion of the magnesium may more conveniently be removed by one or more condensers of known type, the relatively small proportion of magnesium vapor surviving the condensers then being recovered according to the invention. Typical vapor mixtures of high concentration are encountered in the purification of magnesium by distillation, the inert gas present being usually hydrogen, helium, or other inert gas supplied as a carrier medium or for other purposes.

The process of the invention is also useful in connection with the production of magnesium by the high-temperature reduction of magnesia-containing materials with carbon, wherein the magnesium is liberated in admixture with carbon monoxide, from which it is separated by any of a number of quenching procedures known in the art. In this quenching operation as ordinarily carried out, a certain proportion of the magnesium may escape the quench together with the carbon monoxide. The recovery of this magnesium, which has never heretofore been effected, may be accomplished by the process of the invention.

Figure 2:
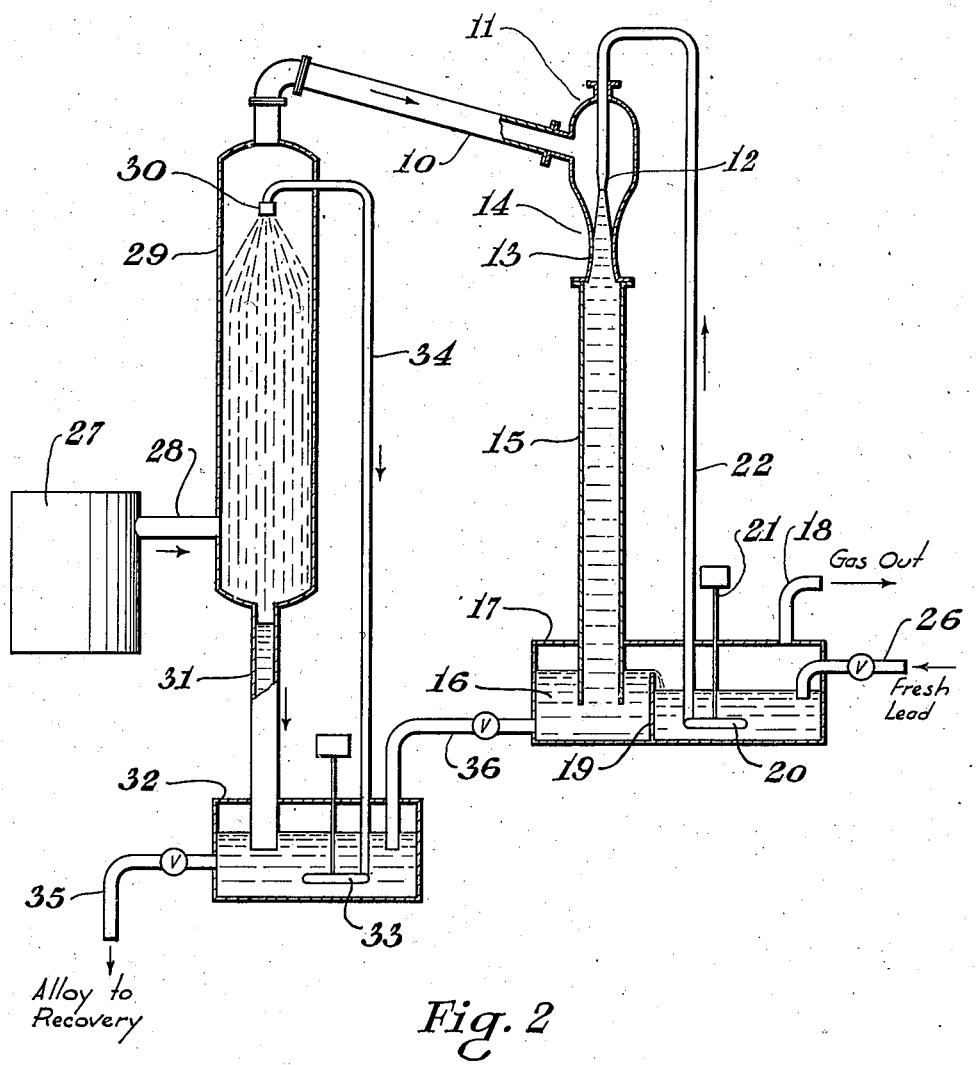

The invention may be further explained with reference to the accompanying drawings in which Figure 1 is a diagrammatic representation of apparatus for recovering magesium which embodies the principle of the invention; and Figure 2 is a diagrammatic representation of another form of apparatus embodying the invention.

In the apparatus as illustrated in Figure 1, magnesium vapor to be recovered is generated in admixture with a small proportion of an inert gas, such as hydrogen or helium, in an internally heated distillation vessel 3 of conventional design (shown in fragmentary form). From the vessel, the vapor mixture passes through a conduit 4 into the interior of a barometric surface condenser 5 provided with a jacket 6 for air-cooling the same to a condensing temperature, e. g. 650° to 670° C., and maintained at subatmospheric pressure, suitably 2 to 10 millimeters, of mercury absolute, by means later to be described. Most of the magnesium in the vapor mixture entering the condenser 5 is condensed on contact with the walls thereof. This magnesium drains to the bottom of the vessel and is withdrawn through the run-down pipe or barometric leg 7, of a height at least equal to the barometric height of magnesium, i. e. about 22 feet, which leg terminates beneath the surface of a body of molten magnesium in a hot-well 8 provided with a draw-off 9.

The mixture of non-condensable gas and small proportion of magnesium vapor which survives the condenser 5 escapes through an exhaust pipe 10 maintaining the condenser in operative communication with the confined contact zone of a siphon jet ejector 11, which latter serves both as the means for recovering the surviving magnesium vapor and also as the evacuating means for maintaining the surface condenser 5 at the desired sub-atmospheric pressure. In the ejector 11, the vapor mixture comes into contact with a rapidly moving jet of molten lead-magnesium alloy supplied through a nozzle 12 which directs the jet into the throat 13 of a Venturi tube 14 forming the outlet of the ejector. The Venturi-throat of the ejector exhausts into a run-down pipe or barometric leg 15, of a height at least equal to the barometric height of the lead-magnesium alloy, e. g. about 6 feet for a 92 per cent lead-8 per cent magnesium alloy. This pipe 15 in turn terminates beneath the surface of a body of molten alloy 16 which has already passed through the jet zone and is maintained in a closed hot-well 17 provided at the top with a gas outlet 18. The hot-well 17 is divided into two portions by a dam, one portion serving to contain the molten alloy 16, and the other portion acting as a reservoir 19 for a second body of alloy. Submerged within the alloy in the reservoir 19 is a centrifugal pump 20 driven through a shaft 21 by means not shown and connected by a pipe 22 with the jet nozzle 12 within the ejector body 11.

A small portion of the alloy forwarded by the pump 20 may be bled off as necessary through a valved line 23 into the upper portion of a conventional metallurgical still 24. In the still, part or all of the magnesium contained in the alloy entering through the pipe 23 is vaporized from the alloy and passes to a condenser 25 from which it may be withdrawn from time to time. The residual lead alloy, with most of the magnesium removed, is returned to the reservoir 19 through a valved line 26. If desired, the condenser 25 may be omitted, the magnesium vapor from the still 24 being condensed in the initial condenser 5. All the apparatus shown is protected against heat loss and freezing of the molten metal by thermal insulation and heaters not illustrated.

In practice, the pump 20 is operated at a speed such that the molten alloy issues from the nozzle 12 at a velocity such that the Venturi-throat 13 is filled sufficiently to exhaust the condenser 5 at a rate sufficient to maintain the latter at a desired sub-atmospheric pressure. For instance, in apparatus in which the condenser 5 is designed to recover the magnesium in a vapor mixture of 99 per cent magnesium and 1 per cent inert gas, supplied by the distillation vessel 3 at a temperature of about 650° to 660° C. and at about 500 pounds per hour, the condenser to be maintained at a pressure of about 3 millimeters of mercury absolute, the pump 20 should be adjusted to circulate alloy through the nozzle 12 at a velocity of at least 20 feet per second, and at a rate of about 100 gallons per minute, the alloy being maintained at a magnesium concentration of about 8 per cent and at a temperature of about 550° C. Under these conditions the major portion of the magnesium in the vapor mixture, e. g. 450 to 485 pounds per hour, is recovered in the condenser 5, and withdrawn from time to time from the hot-well 8. The surviving non-condensable gas and residual magnesium are exhausted into the ejector body 11 and become entrapped in the jet of molten alloy, the magnesium being largely absorbed or condensed on contact with the alloy. Any surviving magnesium entrapped in the jet is condensed when the jet issues from the Venturi-throat 13 and is increased in cross sectional area, whereupon the static pressure on the alloy increases suddenly. The descending alloy enters the pool 16, a further pressure increase occurring as the alloy descends the leg 15 into the pool 16, which is at substantially atmospheric pressure. In the pool, the alloy is stilled and the entrapped non-condensable gas bubbles out of the melt, escaping through the outlet 18. The alloy then overflows into the reservoir 19 and is recirculated to the jet nozzle 12, being cooled to operating temperature, if necessary, by means not shown. A portion of the circulating alloy is continuously or intermittently bled off to the still 24 and the magnesium content thereof reduced to maintain the entire body of alloy at a substantially constant concentration.

In the apparatus illustrated in Figure 2, the invention is shown applied to the production of magnesium by the thermal reduction of magnesia by means of carbon. The reduction mixture is charged into a vacuum furnace 27, shown in fragmentary view, and heated to a temperature sufficient to liberate a vapor mixture containing roughly equal volumes of magnesium and carbon monoxide, in accordance with known practice. This vapor mixture escapes through the vapor tube 28 into a lead-quench condenser 29 maintained at a drastically reduced pressure, and there encounters a shower of molten lead containing a small proportion of dissolved magnesium and continuously supplied by a nozzle 30. Most of the magnesium in the vapor mixture is condensed or absorbed in the lead alloy, the resulting enriched alloy being drained from the quench through a barometric leg 31 into a hot-well 32. Most of the alloy in the hot-well is recirculated to the nozzle 30 by means of a submerged pump 33 and pipe 34, but a portion is continuously withdrawn through the outlet 35 and is treated to recover the magnesium content thereof, as by distillation. Details of operating the furnace 27 and the lead-quench 29 are in accordance with known practice.

The lead quench 29 is exhausted to the desired subatmospheric pressure and the small amount of magnesium vapor surviving in the carbon monoxide escaping the quench is recovered in a jet ejector 11 in communication with the quench 29 through an exhaust pipe 10. The ejector 11, nozzle 12, and alloy circulating system are closely similar to that already explained with reference to Figure 1. However, instead of withdrawing a portion of the circulating alloy from the pipe 22 and recovering magnesium therefrom, as in Figure 1, that portion of the alloy withdrawn from the reservoir 16 is transferred through a valved line 36 into the hot-well 32, from which it is circulated to the lead-quench 29. In this way, the lead alloy containing the lowest proportion of magnesium is used as the actuating fluid for the ejector-condenser 11, where it meets the most dilute magnesium vapor, and is then transferred to the quench system, wherein it is brought into contact with richer magnesium vapors to be condensed. Maximum efficiency of magnesium recovery is thus secured.

The foregoing description merely illustrates ways of carrying the principle of the invention into practice, and is not intended as strictly limitative, the invention being co-extensive in scope with the following claims.

I claim:

1. In a method of recovering magnesium from a vapor mixture thereof with a non-condensable gas, the steps which comprise: admitting the vapor mixture into a confined zone, directing therethrough a rapidly moving continuous stream of a liquid condensing medium chemically inert to magnesium and supplied at a condensing temperature for magnesium vapor, the velocity of the stream being sufficiently high that substantially all the vapor mixture becomes entrapped therein and is exhausted from the zone together therewith, the magnesium vapor being simultaneously condensed; thereafter in the second zone separating the entrapped non-condensable gas from the liquid medium and the condensed magnesium; and recovering the condensed magnesium.

2. In a method of recovering magnesium from a vapor mixture thereof with a non-condensable gas, the steps which comprise: admitting the vapor mixture into a closely confined zone maintained at sub-atmospheric pressure, said zone having an outlet of restricted cross-sectional area, and projecting through the zone into the outlet thereof at least one jet of a molten metal absorbent for the liquid magnesium supplied at a condensing temperature for magnesium vapor, the rate of flow of the metal in the jet being sufficiently high that substantially all the cross-sectional area of the outlet is filled by the exiting medium and that the magnesium-containing vapor mixture becomes entrapped in the moving medium and is exhausted from the zone at a rate sufficient to maintain the zone at the desired sub-atmospheric pressure, the magnesium vapor being simultaneously condensed during contact with the moving molten metal absorbent; thereafter in a second zone separating the entrapped non-condensable gas from the magnesium-containing molten metal; and recovering the condensed magnesium from the resultant gas-free molten metal absorbent.

3. A process according to claim 2 wherein the molten metal absorbent is a metal having a very low vapor pressure at the operating temperature.

4. A process according to claim 2 wherein the molten metal absorbent is a metal selected from the class consisting of lead and alloys of lead with magnesium.

5. In a method of separating magnesium from a vapor mixture thereof with a non-condensable gas, the steps which comprise: admitting the vapor mixture into a closely confined zone maintained at sub-atmospheric pressure, said zone having an outlet of restricted cross-sectional area, and projecting through the zone and into the outlet thereof at least one jet of a liquid condensing medium chemically inert to the magnesium and supplied at a condensing temperature for magnesium vapor, the rate of flow of the medium in the jet being sufficiently high that substantially all of the magnesium-containing vapor mixture becomes entrapped in the moving medium and is exhausted from the zone together therewith, at a rate sufficient to maintain the zone at the desired sub-atmospheric pressure, the magnesium vapor being in part condensed by contact with the medium; immediately thereafter increasing the static pressure on the moving medium, whereby any surviving magnesium vapor is instantly condensed therein; thereafter in a second zone separating the entrapped non-condensable gas from the liquid medium and the condensed magnesium; and recovering the condensed magnesium from the liquid medium.

6. In a method of condensing magnesium from a vapor mixture thereof with a non-condensable gas, the steps which comprise: admitting the vapor mixture to a closely confined zone maintained at sub-atmospheric pressure, said zone having an outlet of restricted cross-sectional area, and projecting through the zone to the outlet thereof at least one jet of a liquid condensing medium chemically inert to the magnesium and supplied at a condensing temperature for magnesium, the rate of flow of the latter being sufficiently high that substantially all the vapor mixture is entrapped in the jet and exhausted from the zone at a rate sufficient to maintain the zone at the desired sub-atmospheric pressure, the entrapped magnesium vapor being condensed in part in the medium of the jet by contact therewith; and sharply decreasing the velocity of the jet immediately after it leaves the zone, whereby the pressure thereon is rapidly increased and any surviving entrapped magnesium vapor is instantly condensed therein; thereafter in a second zone separating the entrapped non-condensable gas from the magnesium containing medium; and recovering magnesium from the gas-free medium.

7. In a process for the production of metallic magnesium wherein a magnesium-containing raw material is heated to liberate a vapor mixture of magnesium and a non-condensable gas and wherein the vapor mixture is then passed into a condenser maintained at substantially reduced pressure to separate most of the magnesium therefrom, leaving a residual vapor mixture containing magnesium and a non-condensable gas, the improved method of exhausting such vapor mixture from the condenser and simultaneously recovering the residual magnesium vapor therefrom which comprises admitting the vapor mixture to a closely confined zone maintained at sub-atmospheric pressure, said zone having an outlet of restricted cross-sectional area, and projecting through the zone into the outlet thereof at least one jet of a molten metal absorbent for magnesium, the rate of flow of the latter being sufficiently high that substantially all the vapor mixture is entrapped in the jet and exhausted from the zone at a rate sufficient to maintain the zone at the desired subatmospheric pressure, the entrapped magnesium vapor being condensed in part in the molten metal of the jet on contact therewith; and sharply decreasing the velocity of the jet immediately after it leaves the zone, whereby the pressure thereon is increased and any surviving entrapped magnesium is instantly condensed therein; separating the magnesium-containing absorbent from the entrapped gas; and recovering magnesium from the gas-free absorbent.

8. Magnesium condensing apparatus comprising, in combination with a source of magnesium vapor and a closed condenser for the vapor in communication with the vapor source, means for exhausting the condenser and simultaneously recovering residual uncondensed magnesium from the exhaust comprising a siphon jet ejector in operative communication with the condenser, a source of a liquid condensing medium for recovering the residual magnesium vapor, and circulating means for withdrawing condensing medium from the source and supplying the same to the ejector as the operating fluid.

9. Magnesium condnesing apparatus comprising, in combination with a source of magnesium vapor and a closed condenser for the vapor in communication with the vapor source, means for exhausting the condenser and simultaneously recovering residual magnesium vapor in the condenser exhaust comprising a barometric siphon jet ejector in operative communication with the condenser, a reservoir for a liquid medium for recovering the residual magnesium vapor, circulating means for withdrawing said medium from the source and supplying the same to the ejector as the operating fluid, and means for recovering magnesium from the liquid medium after its passage through the ejector.

10. Magnesium condensing apparatus comprising, in combination with a source of magnesium vapor and a lead-quench condenser in communication with the vapor source, means for exhausting the lead-quench condenser and simultaneously recovering residual magnesium vapor in the condenser exhaust comprising a siphon jet ejector in operative communication with the condenser, a reservoir for molten lead, means for withdrawing lead from the reservoir and circulating it to the ejector as the operating fluid, and means for withdrawing at least part of the lead from the ejector after passage therethrough and circulating the same to the lead-quench condenser as the condensing medium therein.

THOMAS GRISWOLD, Jr.